United States Patent
Wesler

(10) Patent No.: US 12,472,527 B1
(45) Date of Patent: Nov. 18, 2025

(54) BOLT LUBRICATION APPARATUS

(71) Applicant: Mitchell Wesler, New Paris, OH (US)

(72) Inventor: Mitchell Wesler, New Paris, OH (US)

( * ) Notice: Subject to any disclaimer, the term of this patent is extended or adjusted under 35 U.S.C. 154(b) by 7 days.

(21) Appl. No.: 18/762,360

(22) Filed: Jul. 2, 2024

(51) Int. Cl.
*F02C 7/06* (2006.01)
*B05C 3/109* (2006.01)
*F16N 3/00* (2006.01)

(52) U.S. Cl.
CPC .............. *B05C 3/109* (2013.01); *F16N 3/00* (2013.01)

(58) Field of Classification Search
CPC .................. B05C 3/109; F16N 3/00
See application file for complete search history.

(56) References Cited

U.S. PATENT DOCUMENTS

| | | | | |
|---|---|---|---|---|
| 1,269,685 | A * | 6/1918 | Cummins | F16N 21/06 184/88.1 |
| 5,565,242 | A * | 10/1996 | Buttrick, Jr. | B23P 19/06 427/230 |
| 7,325,653 | B2 * | 2/2008 | Gunderson | F01M 11/0408 184/1.5 |
| 8,651,239 | B2 * | 2/2014 | Aida | F16H 57/0408 184/6.12 |
| 9,533,324 | B2 * | 1/2017 | Presley | B05C 3/109 |
| 9,737,643 | B2 * | 8/2017 | Roller | A61L 27/58 |
| 10,030,760 | B2 * | 7/2018 | Ogawa | F16H 57/02 |
| 10,364,937 | B2 * | 7/2019 | Lewis | F16N 19/003 |
| 10,578,019 | B2 * | 3/2020 | Valva | F16N 7/14 |
| 12,134,414 | B2 * | 11/2024 | Pieper | B61K 3/00 |
| 2019/0003389 | A1 * | 1/2019 | Valva | F16N 7/14 |

FOREIGN PATENT DOCUMENTS

| | | |
|---|---|---|
| EP | 2406336 B1 | 5/2013 |
| EP | 2611547 B1 | 9/2018 |

* cited by examiner

Primary Examiner — Michael A Riegelman

(57) ABSTRACT

The bolt lubrication apparatus has a base and a plunger wherein the plunger slides vertically within the base. The base has flared arms, an upper section, and a lower section. The plunger has a plunger top and a sealed base. The flared arms provides an area where the user can grab the base with two fingers and push the plunger down with a thumb. The upper section provides an area that receives lubricant and is injected into the lower section. The sealed base forms a seal between the plunger and the upper section to ensure the lubricant is contained within the lubricant cavity until it is injected through channels. As the lubricant travels through the channels, the lubricant is then ejected through the bottom opening onto a threaded surface of a bolt received within the internal cylinder cavity.

20 Claims, 13 Drawing Sheets

BOLT LUBRICATION APPARATUS

FIELD OF THE INVENTION

The present invention relates generally to a bolt lubrication apparatus. More specifically the present invention lubricates a bolt thread that is hard to access.

BACKGROUND OF THE INVENTION

Lubricating a bolt thread is a crucial maintenance task that ensures smooth operation and longevity of a fastener. Proper lubrication reduces friction and prevents wearing or seizing. Proper lubrication involves selecting the appropriate lubricant, which could be oil, grease, anti-seize compound, or a specialized thread lubricant, depending on the application and environmental conditions. Currently, tubes of lubricant are utilized where the lubricant has to be smeared along the bolt with a finger or rounded tool. This method covers some of the bolt with a lubricant, however, the entire threaded surface is not properly covered. Additionally, the bolt head receives lubricant, making it hard to fasten the bolt after the lubricant is applied. By regularly lubricating bolt threads, the performance of mechanical assemblies is enhanced, preventing damage during installation and removal, and extending the lifespan of the fasteners, ensuring reliable and efficient operation of the equipment or structure.

DETAIL DESCRIPTIONS OF THE INVENTION

Figure 1:
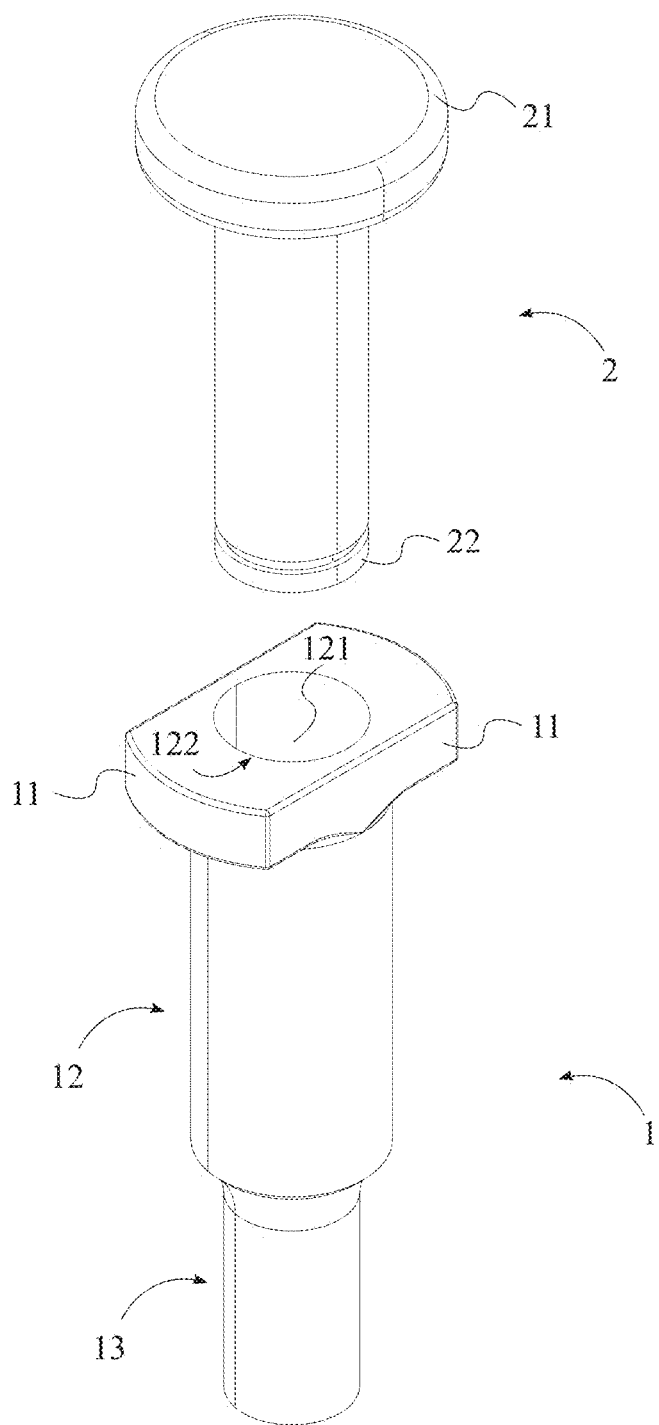
FIG. 1 is a front top right exploded perspective view of the present invention.
Figure 2:
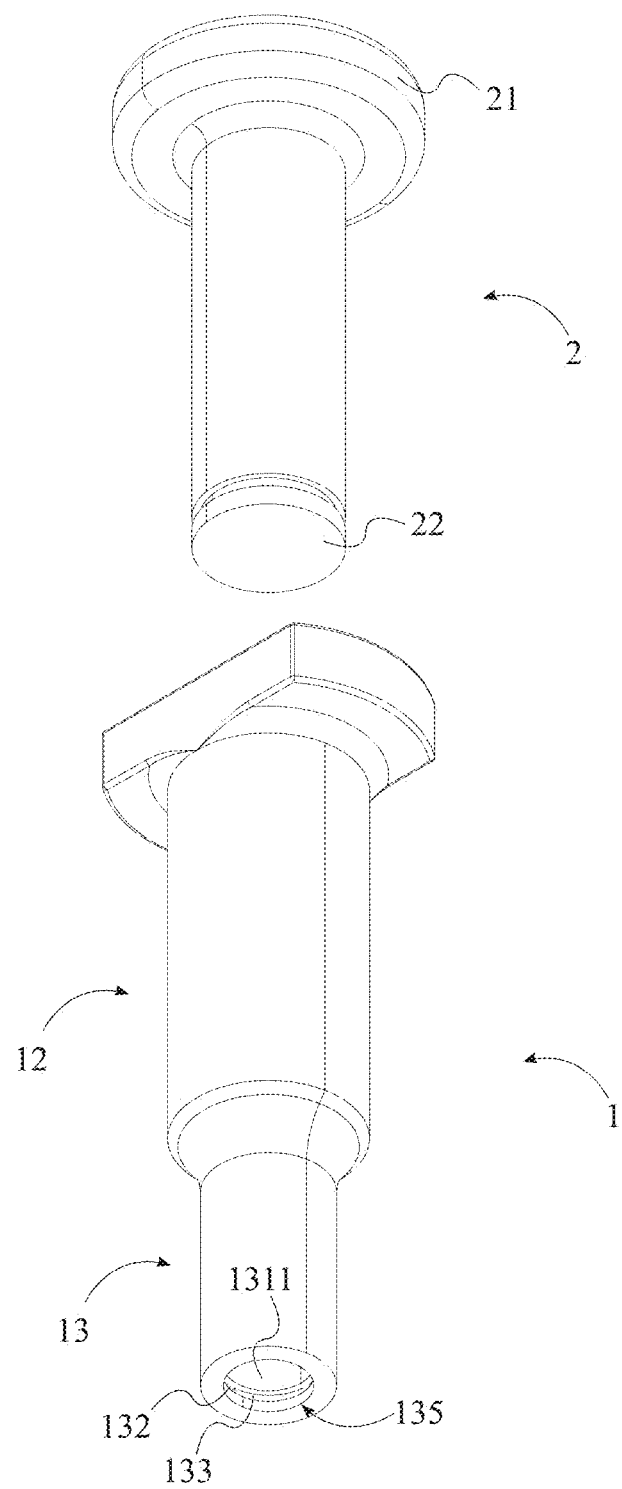
FIG. 2 is a bottom rear right exploded perspective view of the present invention.
Figure 3:
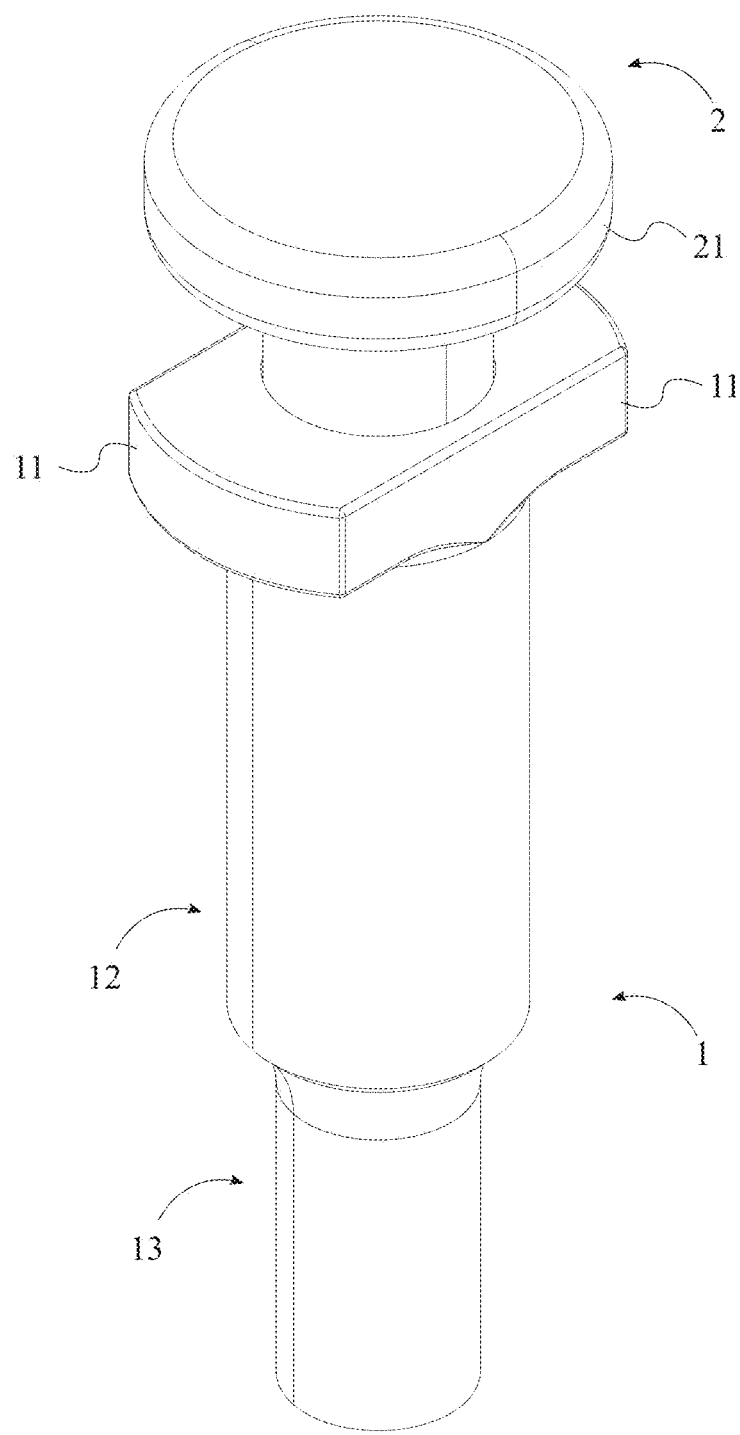
FIG. 3 is an front top right perspective view of the present invention.
Figure 4:
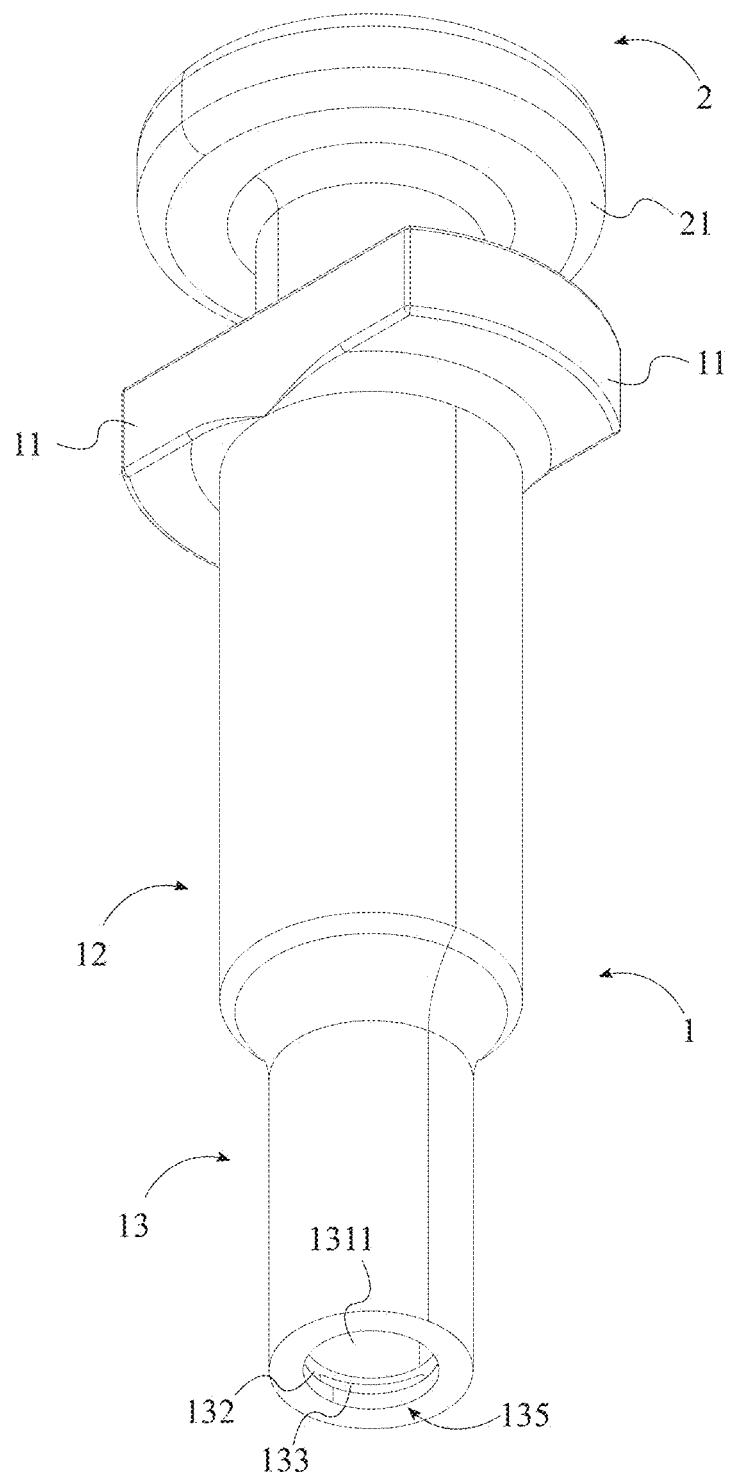
FIG. 4 is a bottom rear right perspective view of the present invention.
Figure 5:
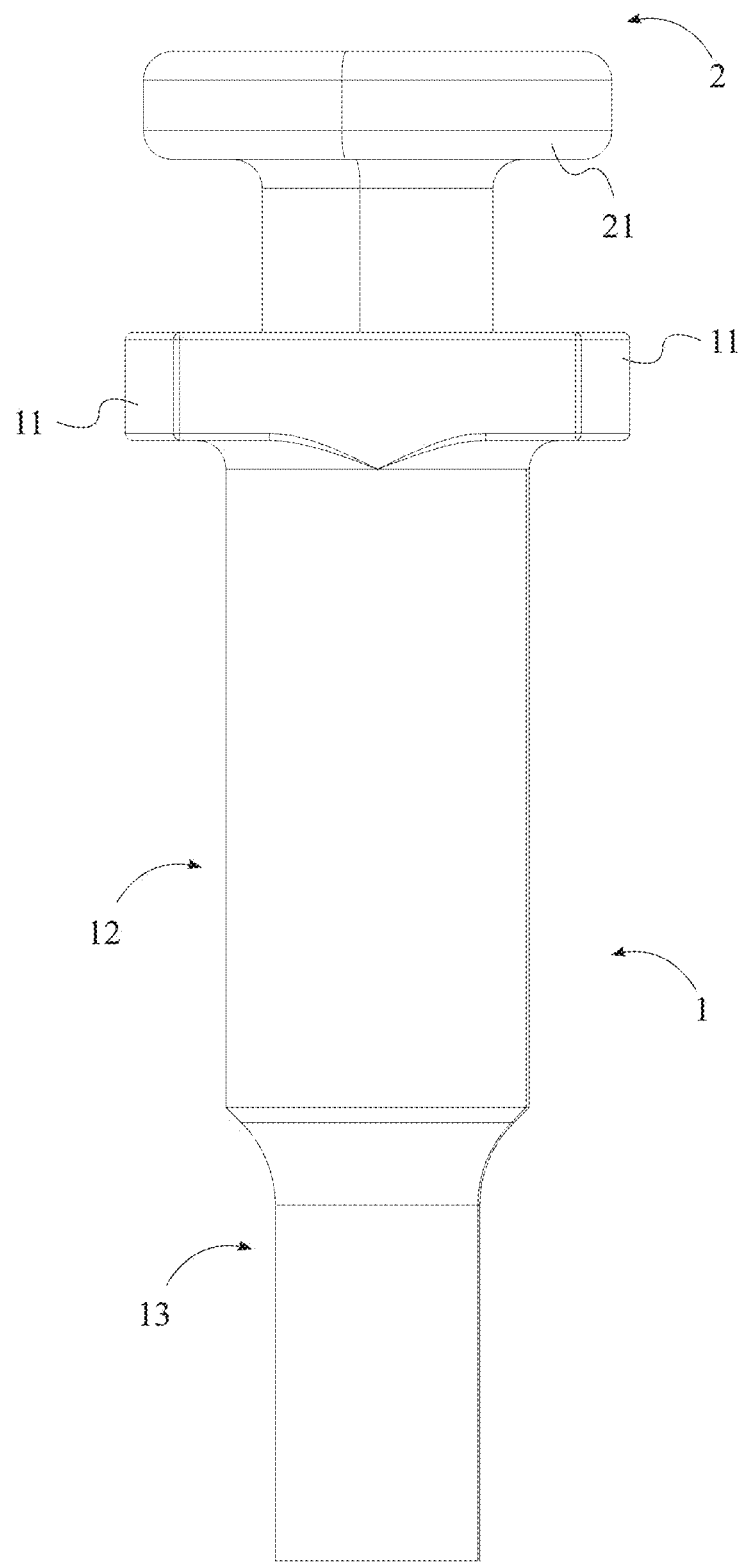
FIG. 5 is a rear side view of the present invention.
Figure 6:
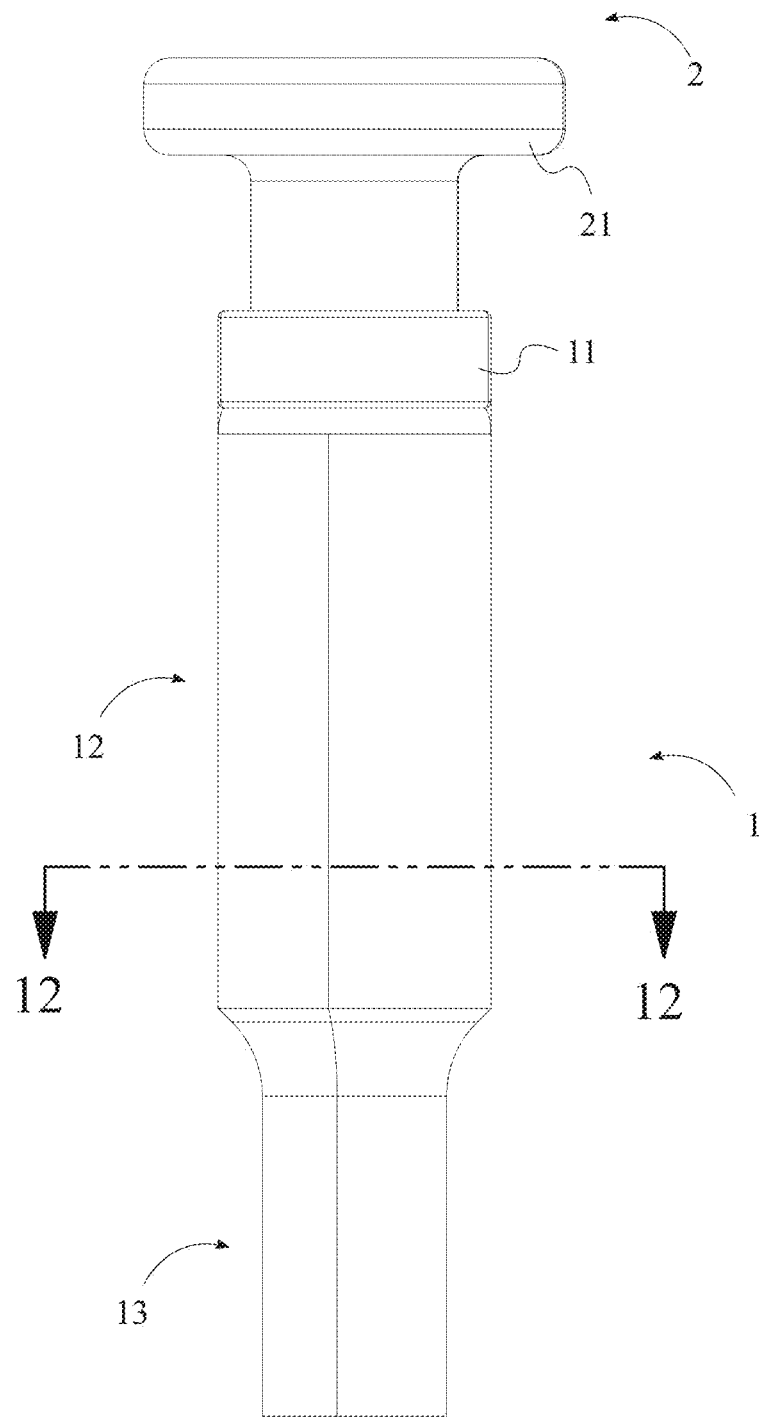
FIG. 6 is a right-side view of the present invention.
Figure 7:
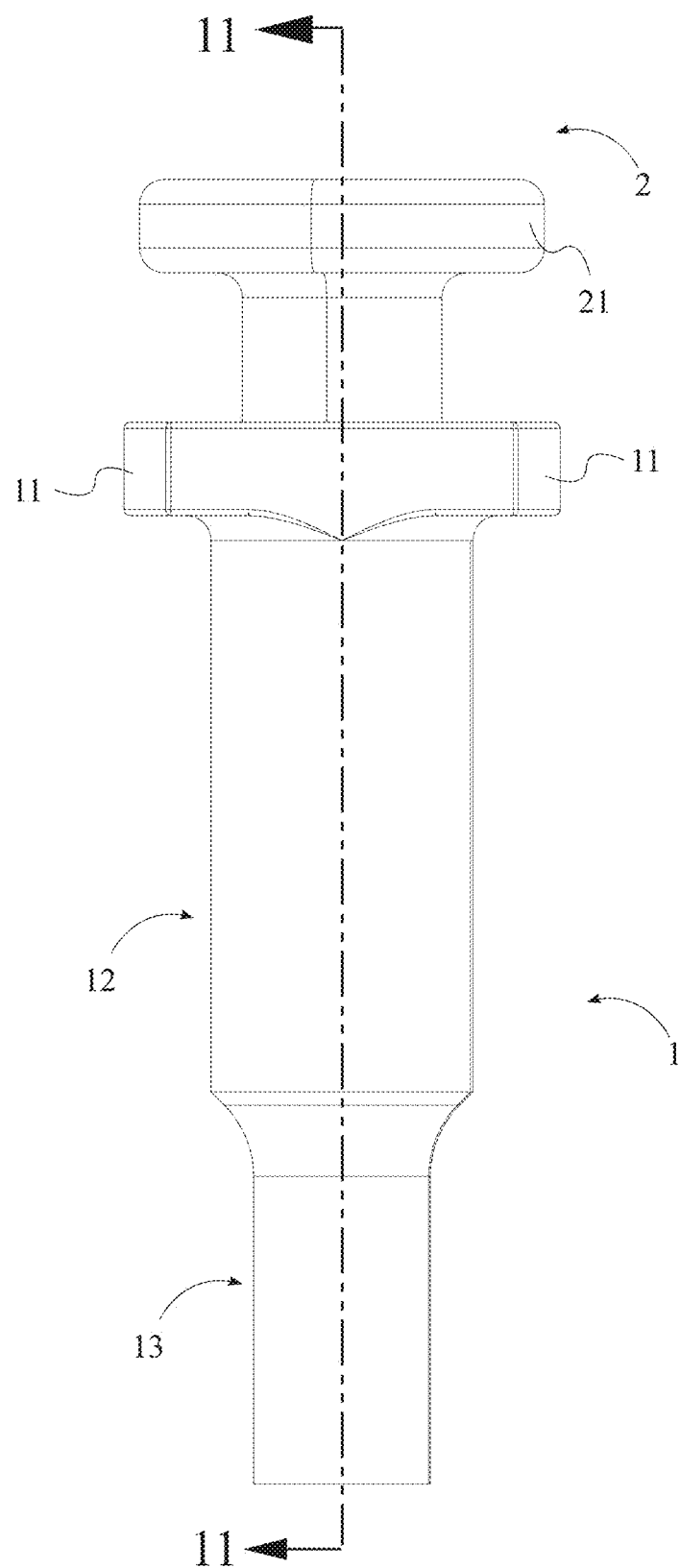
FIG. 7 is a front side view of the present invention.
Figure 8:
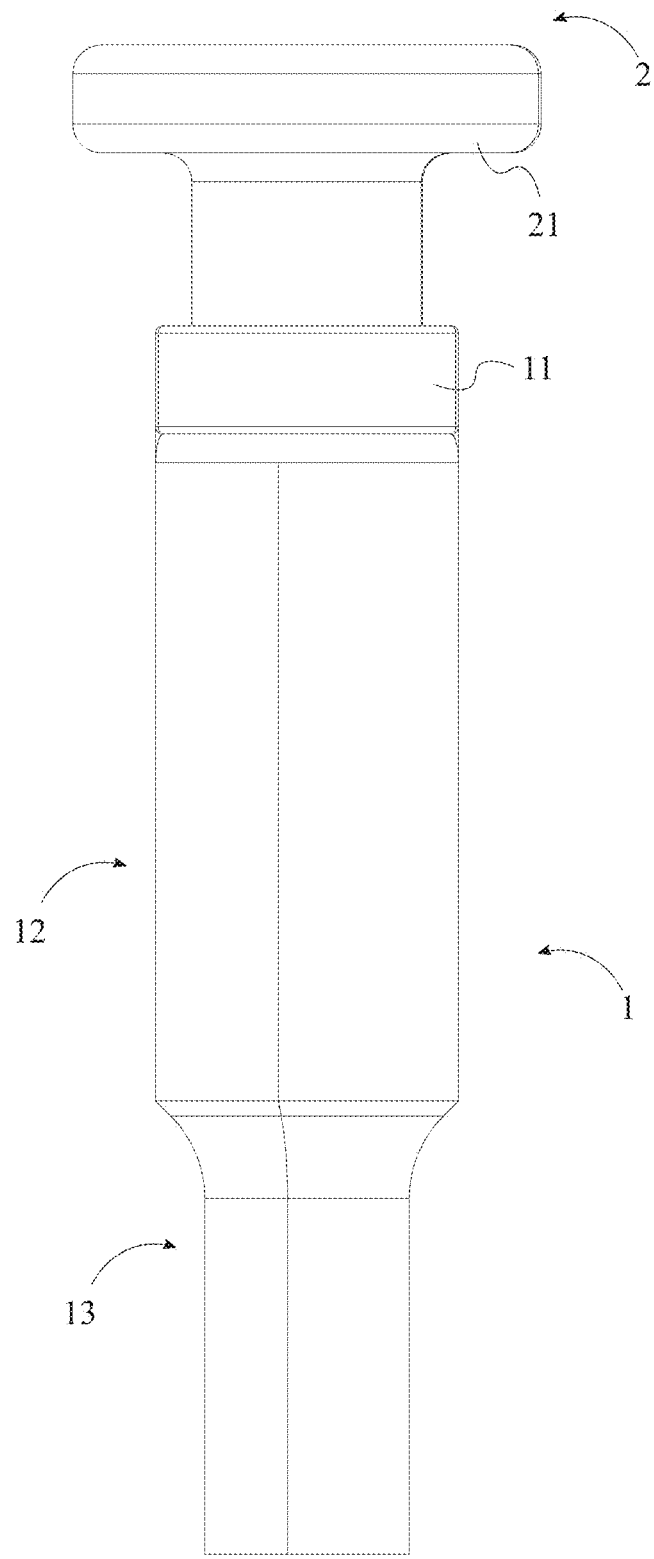
FIG. 8 is a left-side view of the present invention.
Figure 9:
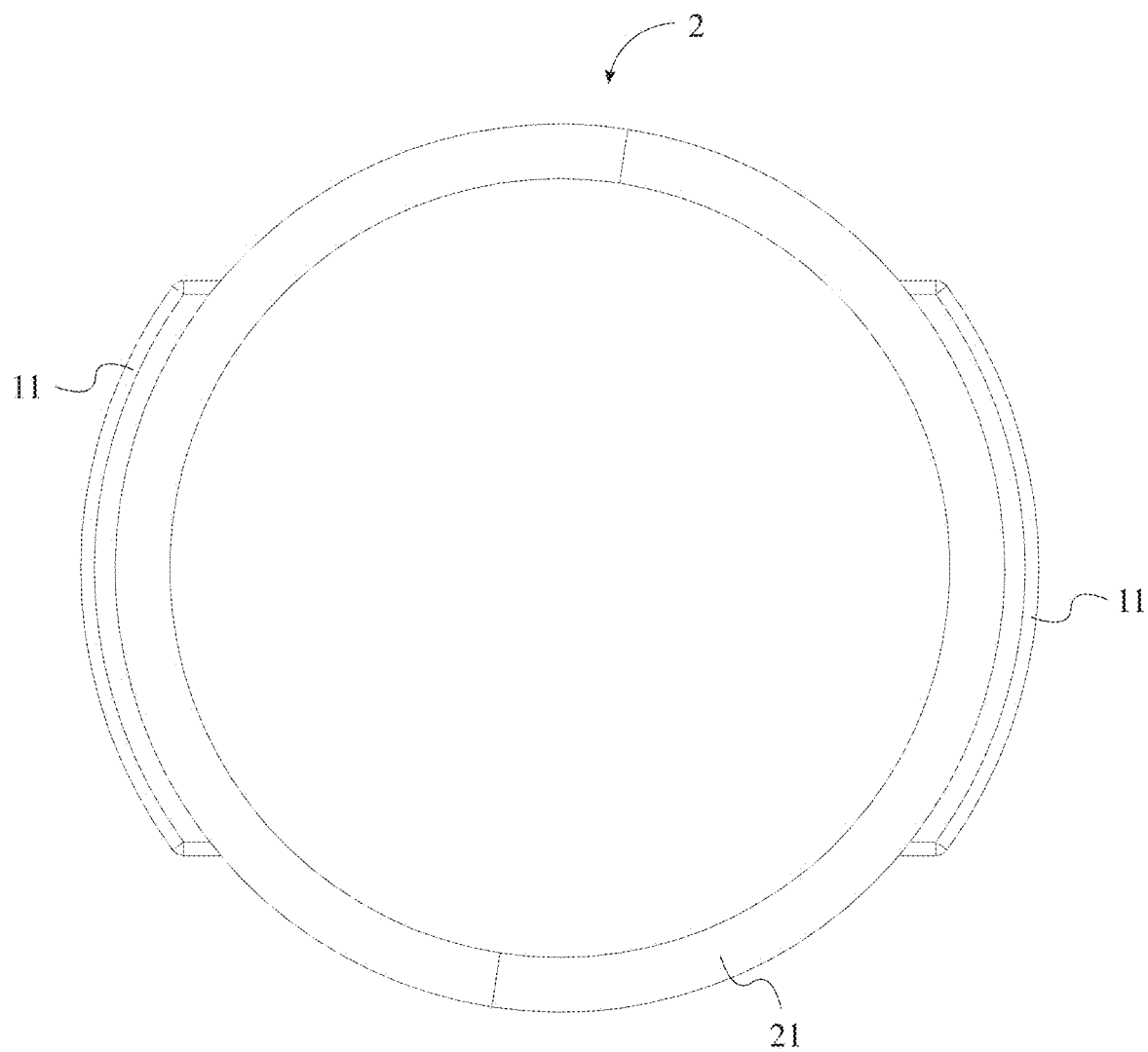
FIG. 9 is an enlarged top view of the present invention.
Figure 10:
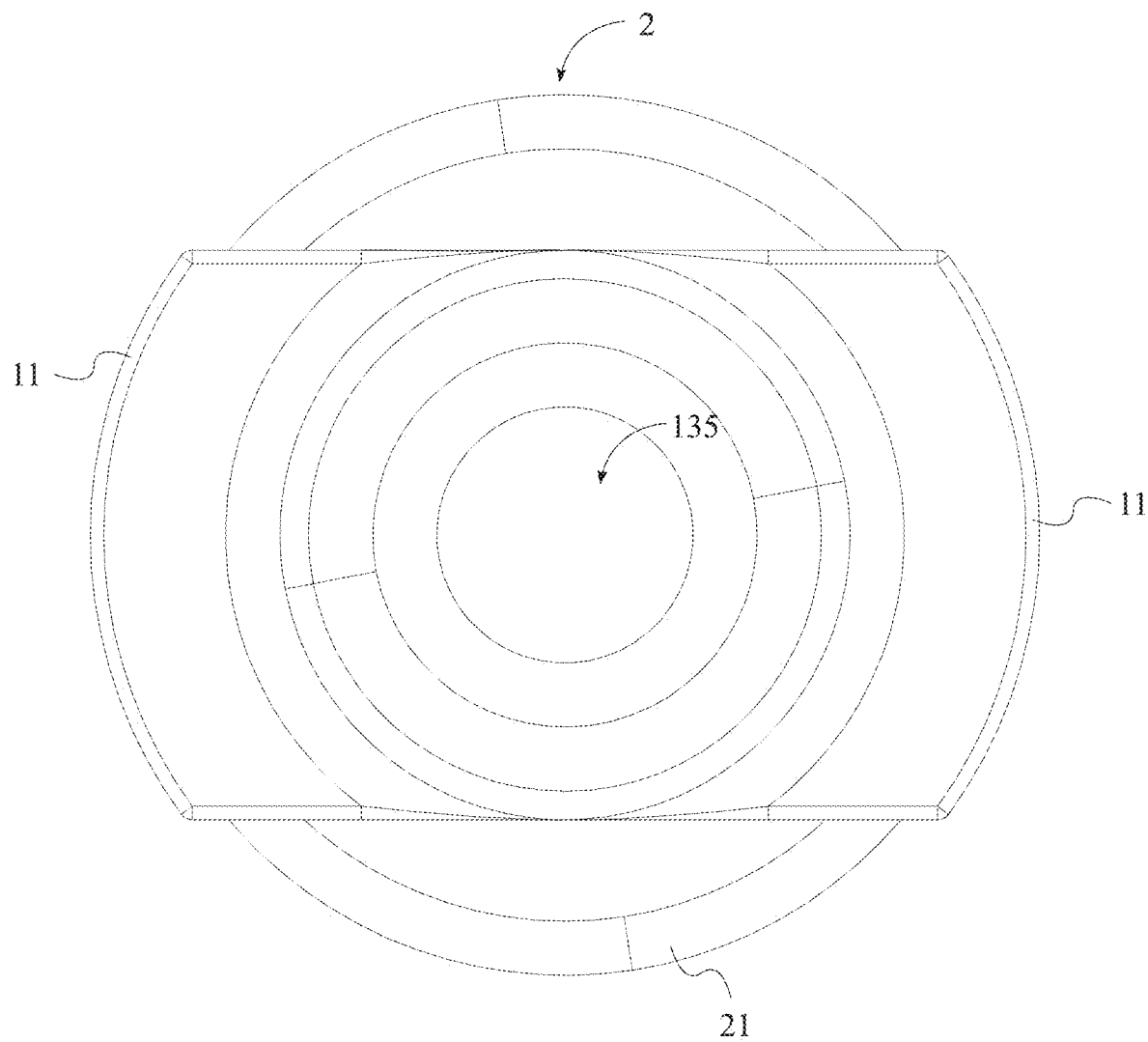
FIG. 10 is an enlarged bottom view of the present invention.

All illustrations of the drawings are for the purpose of describing selected versions of the present invention and are not intended to limit the scope of the present invention.

The present invention is a bolt lubrication apparatus that comprises a base 1 and a plunger 2 as seen in FIG. 1-13. The base 1 further comprises a plurality of flared arms 11, an upper section 12, and a lower section 13. The plunger 2 further comprises a plunger top 21 and a sealed base 22. The plurality of flared arms 11 extends along the top terminal end of the base 1. Accordingly, the plurality of flared arms 11 provides an area where the user can grab the base 1 with two fingers. The upper section 12 is a hollow cylinder. Consequently, the upper section 12 provides an area where a lubricant can be placed. The lower section 13 extends concentrically below the upper section 12. As a result, the lower section 13 receives lubricant that is injected through the upper section 12. The lower section 13 is a hollow cylinder with a diameter smaller than the upper section 12. Thus, the lower section 13 provides a stopping surface for the terminal end of the plunger 2. The plunger top 21 is a cylindrical ridge along the top terminal end of the plunger 2. The sealed base 22 forms a seal along the bottom terminal end of the plunger 2. So, the sealed base 22 ensures the lubricant is contained within the lubricant cavity 121 until it is injected through a plurality of channels 133. The upper section 12 further comprises a lubricant cavity 121 and an upper opening 122. The lower section 13 further comprises an internal cylinder 131, a plurality of connectors 132, a plurality of channels 133, a lubricant gap 134, and a bottom opening 135.

Figure 12:
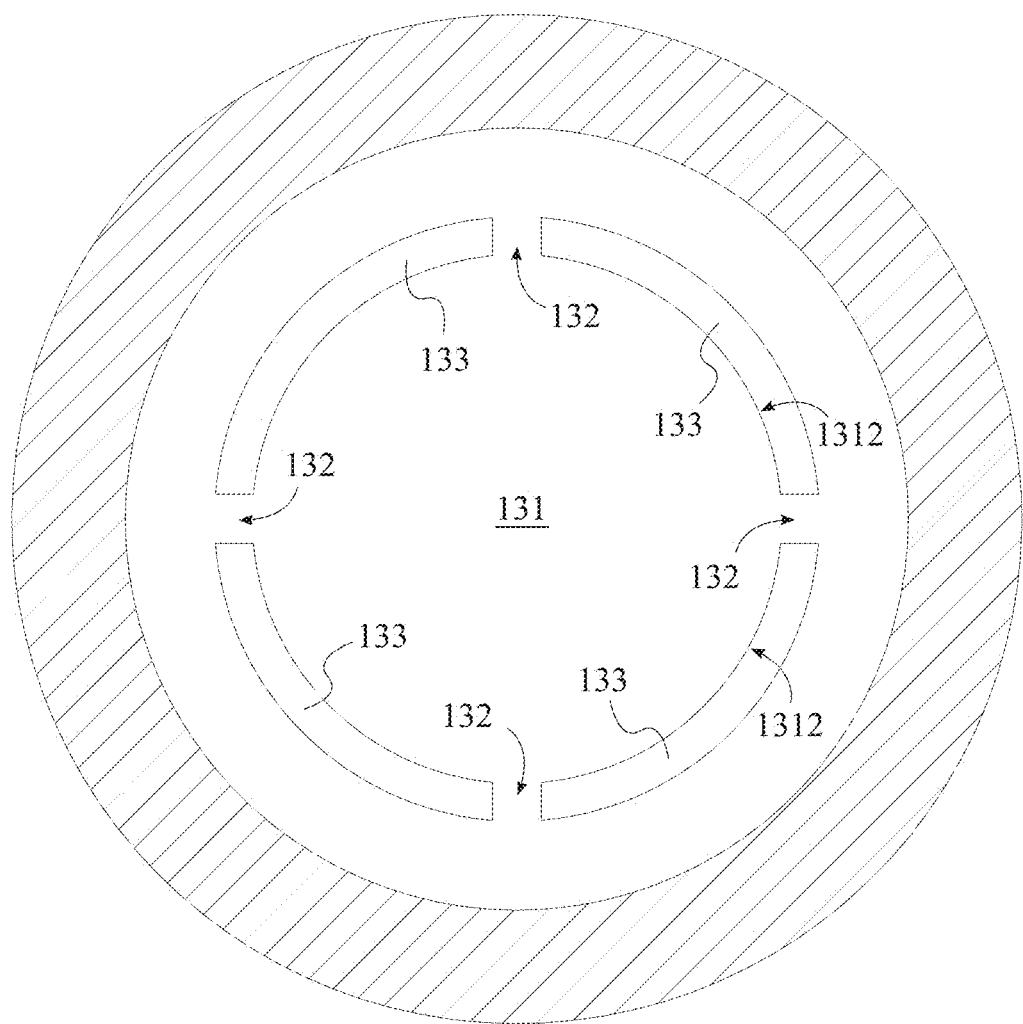
FIG. 12 is an enlarged sectional view of the present invention taken along line 12-12 in FIG. 8.
Figure 13:
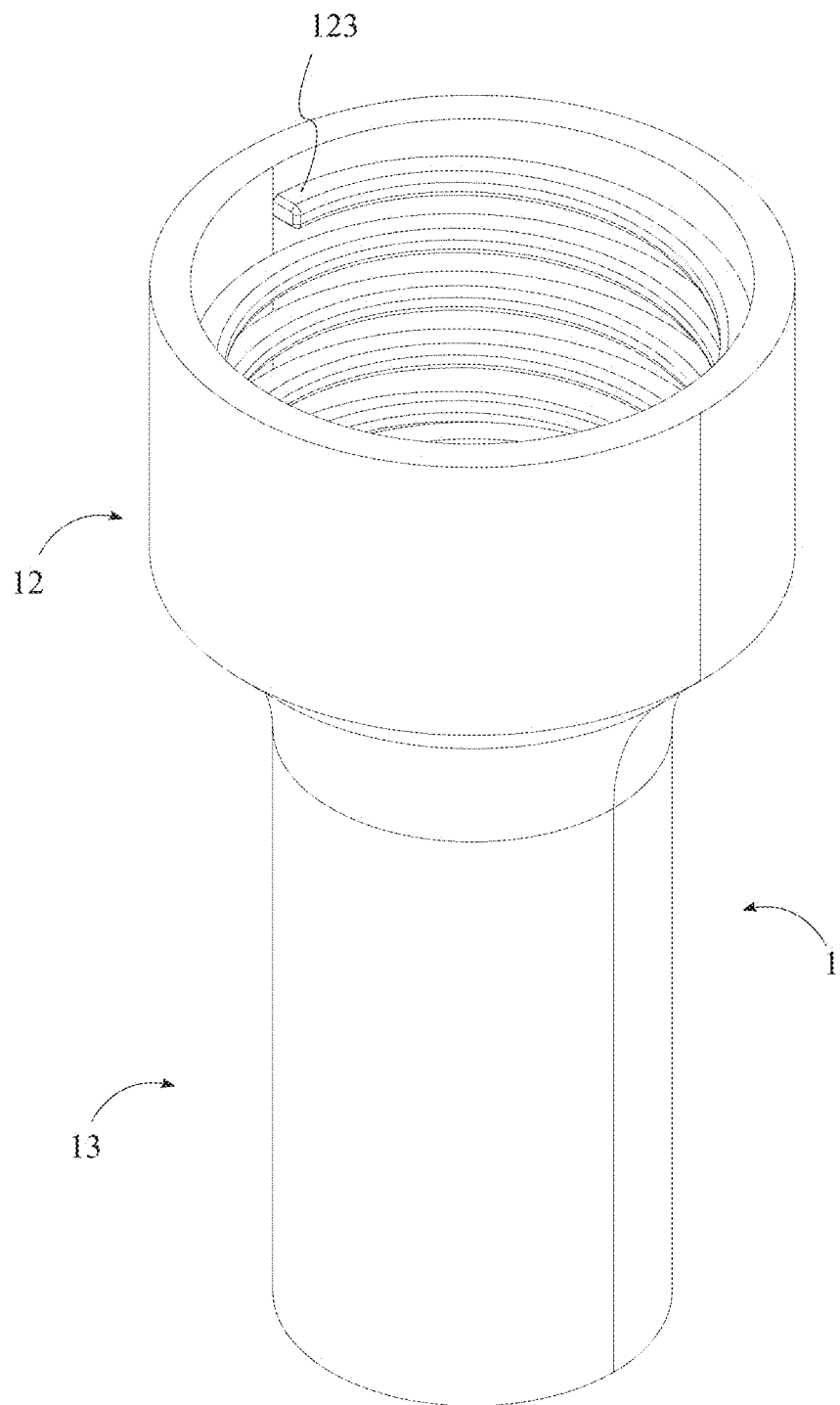
FIG. 13 is an enlarged top front left perspective view of an alternative embodiment of the present invention.

In reference to FIG. 12, the plurality of flared arms 11 provides a ridge that allows for convenient handling of the base 1. Accordingly, this design allows for the present invention to be easily operated by the user with one hand. The lubricant cavity 121 is a cylindrical shape. The lubricant cavity 121 receives a lubricant liquid. Consequently, the lubricant cavity 121 holds the lubricant until the lubricant is injected into the plurality of channels 133. The upper opening 122 receives the sealed base 22 of the plunger 2. As a result, the sealed base 22 seals the lubricant within the lubricant cavity 121. Furthermore, in an alternative embodiment the upper opening 122 further comprises a receiving surface 123 as seen in FIG. 13. The receiving surface 123 is a female threaded surface. The upper opening 122 receives the male threaded surface of a lubricant bottle. This design eliminates the need for a plunger 2 to inject a lubricant around the threaded surface of a bolt.

Figure 11:
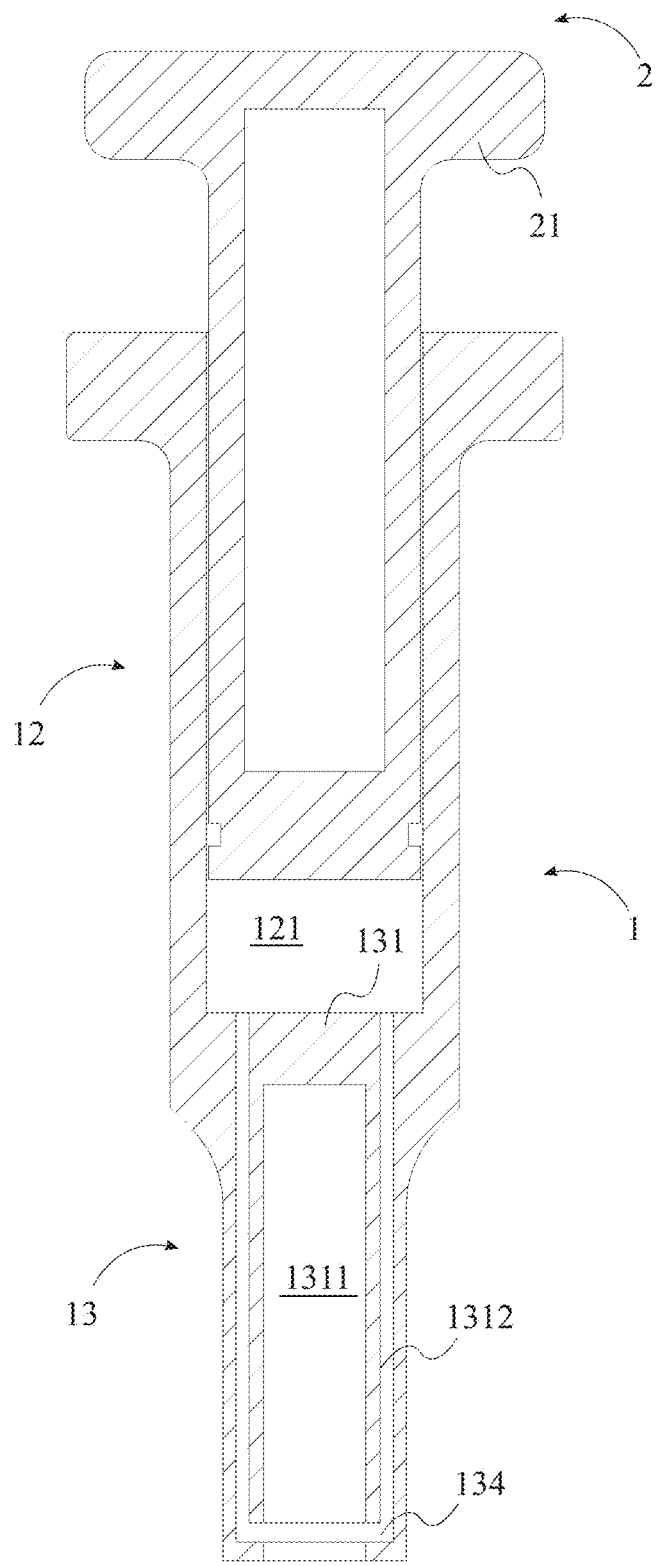
FIG. 11 is a sectional view of the present invention taken along line 11-11 in FIG. 6.

In reference to FIG. 11, the internal cylinder 131 traverses the length of the lower section 13. Thus, the lower section 13 encompasses the internal cylinder 131. The internal cylinder 131 positions concentrically with the lower section 13.

Further, the internal cylinder 131 further comprises an internal cylinder cavity 1311 as seen in FIG. 11. The internal cylinder cavity 1311 is a cylindrical shape. The internal cylinder cavity 1311 receives a bolt. So, the threaded surface of a bolt is exposed to the lubricant injected through the plurality of channels 133.

In reference to FIG. 12, the plurality of connectors 132 secures the internal cylinder 131 to the lower section 13. Accordingly, the plurality of connectors 132 immobilizes the internal cylinder 131 within the lower section 13. The plurality of connectors 132 traverses along the internal cylinder outer surface 1312. Consequently, the plurality of connectors 132 separates each of the plurality of channels 133.

Furthermore, the plurality of channels 133 traverses along the internal cylinder outer surface 1312 as seen in FIG. 12. As a result, the plurality of channels 133 enables lubricant to be ejected onto a bolt threaded surface. The plurality of channels 133 is formed by the space between the internal cylinder outer surface 1312, the plurality of connectors 132, and the lower section 13. Thus, the plurality of channels 133 forms four open spaces through which lubricant can flow downwards. The plurality of channels 133 enabling the lubricant to flow from the lubricant cavity 121 through the plurality of channels 133 to the lubricant gap 134. So, the plurality of channels 133 connects the lubricant cavity 121 to the lubricant gap 134 wherein the lubricant is ejected onto the bolt threaded surface.

In reference to FIG. 11, the lubricant gap 134 is a ring-shaped gap along the bottom of the internal cylinder 131. Accordingly, the lubricant gap 134 encompasses the circumference of a received by the internal cylinder cavity 1311. The lubricant gap 134 enables the lubricant to flow out of the present invention and onto the threaded surface of the bolt within the internal cylinder cavity 1311. Consequently, the lubricant gap 134 directs the lubricant away from the bolt head and onto the bolt threaded surface. The bottom opening 135 is a circular opening traversing through the bottom terminal end of the lower section 13 through the internal cylinder 131. As a result, the bottom opening 135 reaches bolts in constrained areas. The bottom opening 135 enables the bolt to enter the lower section 13. Thus, the bottom opening 135 positions the lubricant gap 134 around the threaded surface of the bolt.

In reference to FIG. 1, the plunger 2 vertically slides within the lubricant cavity 121 of the base 1. So, the plunger 2 pushes lubricant downwards and out of the lubricant cavity 121 as the plunger 2 moves downwards. The plunger 2 injects the lubricant into the plurality of channels 133 as the plunger 2 moves downwards. As a result, the lubricant flows from the lubricant cavity 121, into the plurality of channels 133, through the lubricant gap 134 and onto the threaded surface of the bolt.

Although the invention has been explained in relation to its preferred embodiment, it is to be understood that many other possible modifications and variations can be made without departing from the spirit and scope of the invention as hereinafter claimed.

What is claimed is:

1. A bolt lubrication apparatus comprising:
   a base;
   a plunger;
   the base comprising a plurality of flared arms, an upper section, and a lower section;
   the plunger comprising a plunger top and a sealed base;
   the plurality of flared arms extending along the top terminal end of the base;
   the upper section being a hollow cylinder;
   the lower section extending concentrically below the upper section;
   the lower section being a hollow cylinder with a diameter smaller than the upper section;
   the plunger top being a cylindrical ridge along the top terminal end of the plunger;
   the sealed base forming a seal along the bottom terminal end of the plunger;
   the upper section further comprising a lubricant cavity and an upper opening; and
   the lower section further comprising an internal cylinder, a plurality of connectors, a plurality of channels, a lubricant gap, and a bottom opening.

2. The bolt lubrication apparatus as claimed in claim 1 comprising:
   the plurality of flared arms providing a ridge that allows for convenient handling of the base;
   the lubricant cavity being a cylindrical shape;
   the lubricant cavity receiving a lubricant liquid; and
   the upper opening receiving the sealed base of the plunger.

3. The bolt lubrication apparatus as claimed in claim 2 comprising:
   the upper opening further comprising a receiving surface; and
   the receiving surface being a female threaded surface.

4. The bolt lubrication apparatus as claimed in claim 1 comprising:
   the internal cylinder traversing the length of the lower section; and
   the internal cylinder positioning concentrically with the lower section.

5. The bolt lubrication apparatus as claimed in claim 4 comprising:
   the internal cylinder further comprising an internal cylinder cavity;
   the internal cylinder cavity being a cylindrical shape; and
   the internal cylinder cavity capable of receiving a bolt.

6. The bolt lubrication apparatus as claimed in claim 1 comprising:
   the plurality of connectors securing the internal cylinder to the lower section; and
   the plurality of connectors traversing along the internal cylinder outer surface.

7. The bolt lubrication apparatus as claimed in claim 1 comprising:
   the plurality of channels traversing along the internal cylinder outer surface;
   the plurality of channels being formed by the space between the internal cylinder outer surface, the plurality of connectors, and the lower section; and
   the plurality of channels enabling the lubricant to flow from the lubricant cavity through the plurality of channels to the lubricant gap.

8. The bolt lubrication apparatus as claimed in claim 1 comprising:
   the lubricant gap being a ring-shaped gap along the bottom of the internal cylinder; and
   the lubricant gap enabling the lubricant to flow out of the present invention and onto the threaded surface of the bolt within the internal cylinder cavity.

9. The bolt lubrication apparatus as claimed in claim 1 comprising:
   the bottom opening being a circular opening traversing through the bottom terminal end of the lower section through the internal cylinder; and
   the bottom opening capable of enabling the bolt to enter the lower section.

10. The bolt lubrication apparatus as claimed in claim 1 comprising:
    the plunger vertically sliding within the lubricant cavity of the base; and
    the plunger injecting the lubricant into the plurality of channels as the plunger moves downwards.

11. The bolt lubrication apparatus as claimed in claim 1 comprising:
    the internal cylinder traversing the length of the lower section;
    the internal cylinder positioning concentrically with the lower section;
    the internal cylinder further comprising an internal cylinder cavity;
    the internal cylinder cavity being a cylindrical shape; and
    the internal cylinder cavity capable of receiving a bolt.

12. The bolt lubrication apparatus as claimed in claim 1 comprising:
    the plurality of connectors securing the internal cylinder to the lower section; and
    the plurality of connectors traversing along the internal cylinder outer surface.

13. The bolt lubrication apparatus as claimed in claim 1 comprising:

the plurality of channels traversing along the internal cylinder outer surface;

the plurality of channels being formed by the space between the internal cylinder outer surface, the plurality of connectors, and the lower section; and the plurality of channels enabling the lubricant to flow from the lubricant cavity through the plurality of channels to the lubricant gap.

14. The bolt lubrication apparatus as claimed in claim 1 comprising:

the lubricant gap being a ring-shaped gap along the bottom of the internal cylinder; and the lubricant gap enabling the lubricant to flow out of the present invention and onto the threaded surface of the bolt within the internal cylinder cavity.

15. The bolt lubrication apparatus as claimed in claim 1 comprising:

the bottom opening being a circular opening traversing through the bottom terminal end of the lower section through the internal cylinder;

the bottom opening capable of enabling the bolt to enter the lower section;

the plunger vertically sliding within the lubricant cavity of the base; and the plunger injecting the lubricant into the plurality of channels as the plunger moves downwards.

16. The bolt lubrication apparatus as claimed in claim 1 comprising:

the internal cylinder traversing the length of the lower section;

the internal cylinder positioning concentrically with the lower section;

the internal cylinder further comprising an internal cylinder cavity;

the internal cylinder cavity being a cylindrical shape;

the internal cylinder cavity capable of receiving a bolt;

the plurality of connectors securing the internal cylinder to the lower section; and the plurality of connectors traversing along the internal cylinder outer surface.

17. The bolt lubrication apparatus as claimed in claim 1 comprising:

the plurality of channels traversing along the internal cylinder outer surface;

the plurality of channels being formed by the space between the internal cylinder outer surface, the plurality of connectors, and the lower section; and the plurality of channels enabling the lubricant to flow from the lubricant cavity through the plurality of channels to the lubricant gap.

18. The bolt lubrication apparatus as claimed in claim 1 comprising:

the lubricant gap being a ring shaped gap along the bottom of the internal cylinder;

the lubricant gap enabling the lubricant to flow out of the present invention and onto the threaded surface of the bolt within the internal cylinder cavity;

the bottom opening being a circular opening traversing through the bottom terminal end of the lower section through the internal cylinder;

the bottom opening capable of enabling the bolt to enter the lower section;

the plunger vertically sliding within the lubricant cavity of the base; and the plunger injecting the lubricant into the plurality of channels as the plunger moves downwards.

19. A bolt lubrication apparatus comprising:

a base;

a plunger;

the base comprising a plurality of flared arms, an upper section, and a lower section;

the plunger comprising a plunger top and a sealed base;

the plurality of flared arms extending along the top terminal end of the base;

the upper section being a hollow cylinder;

the lower section extending concentrically below the upper section;

the lower section being a hollow cylinder with a diameter smaller than the upper section;

the plunger top being a cylindrical ridge along the top terminal end of the plunger;

the sealed base forming a seal along the bottom terminal end of the plunger;

the upper section further comprising a lubricant cavity and an upper opening;

the lower section further comprising an internal cylinder, a plurality of connectors, a plurality of channels, a lubricant gap, and a bottom opening;

the plurality of flared arms providing a ridge that allows for convenient handling of the base;

the lubricant cavity being a cylindrical shape;

the lubricant cavity receiving a lubricant liquid;

the upper opening receiving the sealed base of the plunger;

the upper opening further comprising a receiving surface; and the receiving surface being a female threaded surface.

20. A bolt lubrication apparatus comprising:

a base;

a plunger;

the base comprising a plurality of flared arms, an upper section, and a lower section;

the plunger comprising a plunger top and a sealed base;

the plurality of flared arms extending along the top terminal end of the base;

the upper section being a hollow cylinder;

the lower section extending concentrically below the upper section;

the lower section being a hollow cylinder with a diameter smaller than the upper section;

the plunger top being a cylindrical ridge along the top terminal end of the plunger;

the sealed base forming a seal along the bottom terminal end of the plunger;

the upper section further comprising a lubricant cavity and an upper opening;

the lower section further comprising an internal cylinder, a plurality of connectors, a plurality of channels, a lubricant gap, and a bottom opening;

the plurality of flared arms providing a ridge that allows for convenient handling of the base;

the lubricant cavity being a cylindrical shape;

the lubricant cavity receiving a lubricant liquid;

the upper opening receiving the sealed base of the plunger;

the upper opening further comprising a receiving surface; and the receiving surface being a female threaded surface.

* * * * *